United States Patent
Kang et al.

(10) Patent No.: US 9,286,512 B2
(45) Date of Patent: Mar. 15, 2016

(54) METHOD FOR DETECTING PEDESTRIANS BASED ON FAR INFRARED RAY CAMERA AT NIGHT

(71) Applicant: Hyundai Mobis Co., Ltd., Seoul (KR)

(72) Inventors: Byung Jun Kang, Yongin-si (KR); Dong Kyu Ryu, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 141 days.

(21) Appl. No.: 14/256,337

(22) Filed: Apr. 18, 2014

(65) Prior Publication Data

US 2014/0334672 A1 Nov. 13, 2014

(30) Foreign Application Priority Data

May 7, 2013 (KR) ........................ 10-2013-0051120

(51) Int. Cl.
*G06K 9/00* (2006.01)
*H04N 7/18* (2006.01)
*G06K 9/20* (2006.01)

(52) U.S. Cl.
CPC ........ *G06K 9/00369* (2013.01); *G06K 9/00342* (2013.01); *G06K 9/2018* (2013.01)

(58) Field of Classification Search
None
See application file for complete search history.

(56) References Cited

U.S. PATENT DOCUMENTS

| | | | |
|---|---|---|---|
| 2008/0036576 A1* | 2/2008 | Stein | B60R 1/00 340/425.5 |
| 2009/0010495 A1* | 1/2009 | Schamp | B60R 21/0134 382/106 |
| 2012/0300076 A1* | 11/2012 | Aimura | B60R 1/00 348/148 |
| 2013/0243261 A1* | 9/2013 | Matsuda | G06K 9/00805 382/106 |
| 2014/0028842 A1* | 1/2014 | Abramson | H04N 7/188 348/143 |

OTHER PUBLICATIONS

Seemann et al. "An Evaluation of Local Shape-Based Features for Pedestrian Detection" British Machine Vision Conference, Sep. 2005.*

* cited by examiner

*Primary Examiner* — Randolph I Chu
(74) *Attorney, Agent, or Firm* — NSIP Law

(57) ABSTRACT

The present invention relates to a method for detecting a pedestrian based on a far infrared ray (IR) camera at night, which provides a method of receiving a thermal image of a pedestrian from a far IR camera, setting a candidate using a DoG filter having a robust characteristic against image noise, and accurately detecting the pedestrian using a classifier based on a behavioral characteristic of the pedestrian.

13 Claims, 5 Drawing Sheets

FIRST
RESPONSE
VALUE

VARIANCE
VALUE

SECOND
RESPONSE
VALUE

GRAY LEVEL
BINARIZATION

BINARIZATION OF
THE PRESENT
INVENTION

METHOD FOR DETECTING PEDESTRIANS BASED ON FAR INFRARED RAY CAMERA AT NIGHT

CROSS-REFERENCE TO RELATED APPLICATION

This application claims priority to and the benefit of Korean Patent Application No. 10-2013-0051120 filed in the Korean Intellectual Property Office on May 7, 2013, the entire contents of which are incorporated herein by reference.

TECHNICAL FIELD

The present invention relates to a method for detecting a pedestrian at night, and more particularly, to a method for detecting a pedestrian based on a far infrared ray (IR) camera at night that detects a pedestrian based on an image obtained from a far IR camera and determines a position of the pedestrian.

BACKGROUND OF THE INVENTION

Currently, the majority of pedestrian accidents are cited in many traffic accidents. Such pedestrian accidents may lead to deaths, serious injuries, and the like.

In particular, since the visual field for driving significantly decreases at night, a case in which a driver does not detect a pedestrian frequently occurs. To prevent this, presently, researches on a method for providing a view so that a driver may secure the visual field using a sensor such as a near infrared ray (IR) camera or a far IR camera and a night vision system for detecting a pedestrian at night and alerting a driver of the detected pedestrian in advance through a night pedestrian detection are being conducted.

In addition, research on protecting a pedestrian is being actively conducted. For example, there is an advance driver assistance system (ADAS) for preventing a pedestrian accident through a configuration of detecting the pedestrian in advance and alerting a driver of the detected pedestrian or controlling a vehicle to brake.

Honda Motor Corporation has adopted a method for performing binarization using a characteristic that a gray level of a pedestrian appears to be high in an IR camera to extract a pedestrian candidate. However, this method may segment an area by comparing a gray level of a pixel to a peripheral average brightness value; however, there was an issue that a candidate selection error occurs due to image noise.

General Motors (GM) determines a confidence level based on vigilance information and motion information of a pedestrian and detects the pedestrian based on the determined confidence level. A pedestrian detection method using such motion analysis needs to analyze a direction of a motion having occurred over the entire area due to a motion of a camera itself in a case of a vehicle. Accordingly, a relatively long processing time is used. Also, when a pedestrian is motionless, accuracy decreases.

SUMMARY OF THE INVENTION

The present invention has been made in an effort to provide a method for detecting a pedestrian based on a far infrared ray (IR) camera at night that may receive a thermal image of a pedestrian from a far IR camera, may set a candidate using a difference of Gaussian (DoG) filter having a robust characteristic against image noise, and may accurately detect the pedestrian using a classifier based on a behavioral characteristic of the pedestrian.

An exemplary embodiment of the present invention provides a method for detecting a pedestrian based on a far IR camera at night, the method including: receiving a thermal image of a pedestrian; obtaining a first response value at each pixel of the input image using a DoG filter; measuring a variance value at each pixel of the input image; creating a binary image by binarizing a second response value at a pixel calculated through a multiplication of the first response value of the DoG filter and the variance value; creating a pedestrian candidate cluster from the binary image; detecting the pedestrian by classifying the pedestrian candidate cluster using at least one classifier learned based on a behavioral characteristic of the pedestrian; and calculating a position of the pedestrian.

The thermal image may be an image photographed through the far IR camera configured to project IR light. The first response value may be a difference value at the same pixel of two images that are created by performing, by two Gaussian filters having different standard deviations, convolution of the input image, respectively.

The variance value may be a value obtained by calculating contrast between a single pixel of the input image and a neighbor pixel thereof. The binary image may be an image in which a pixel having a relatively low second response value is binarized as "0" (black) and a pixel having a relatively high second response value is binarized as "1" (white).

The creating of the pedestrian candidate cluster may group portions having a similar second response value and thereby cluster the portions into a single area using the component labeling method.

The pedestrian candidate cluster may be classified into three clusters including a cluster in which the pedestrian walks or runs to the left, a cluster in which the pedestrian walks or runs forward or backward, and a cluster in which the pedestrian walks or runs to the right.

The detecting of the pedestrian may finally determine whether the pedestrian candidate cluster is the pedestrian by measuring a reliability value of each classifier created after learning the pedestrian candidate cluster and by adding up the reliability values.

The learning may be to secure data for each similar motion by performing at least one test based on a direction in which and an angle at which the pedestrian moves. The reliability value may be a numerical value of a similarity between learning data secured by each classifier and the pedestrian candidate cluster collected from the binary image. The reliability value may increase according to an increase in the similarity.

The position of the pedestrian may be calculated based on position information of the classified pedestrian in the binary image and camera calibration information. Here, the position information may be obtained by changing a parameter value of the DoG filter based on a size of the pedestrian in the binary image.

According to a method for detecting a pedestrian based on a far IR camera at night of the present invention, it is possible to set a candidate using a far IR camera and a DoG filter, and to improve pedestrian detection accuracy using a classifier learned based on a behavioral characteristic of the pedestrian and thus, it is possible to prevent an accident costing lives.

DETAILED DESCRIPTION OF THE EMBODIMENTS

Hereinafter, a method for detecting a pedestrian based on a far infrared ray (IR) camera at night according to an exemplary embodiment of the present invention will be described in detail with reference to the accompanying drawings.

Figure 1:
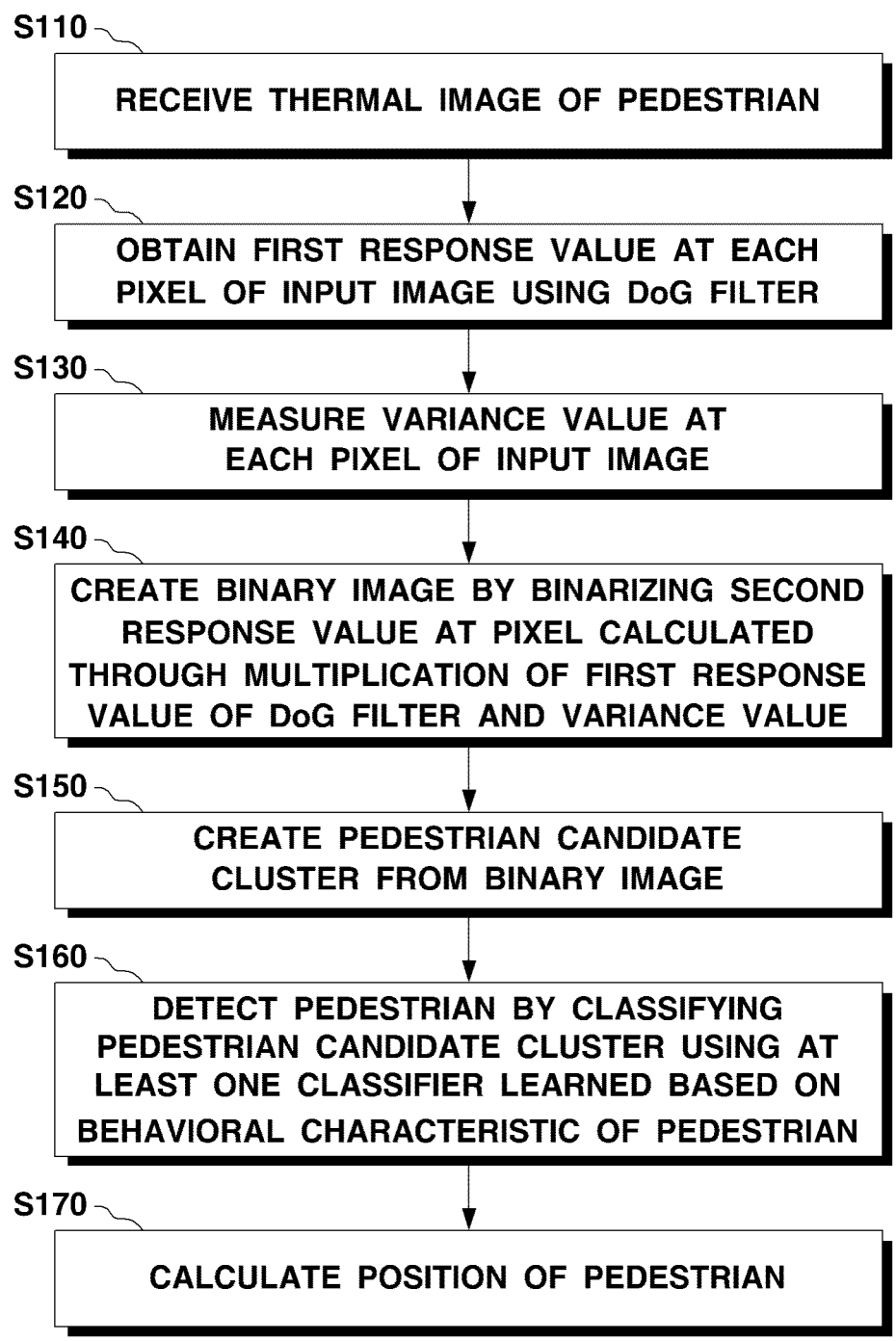
FIG. 1 is a flowchart illustrating a method for detecting a pedestrian based on a far infrared ray (IR) camera at night according to an exemplary embodiment of the present invention.
Figure 2:
FIG. 2 illustrates an image and graphs showing a result of a second response value calculated through a multiplication of a first response value at a pixel and a variance value.
Figure 2:
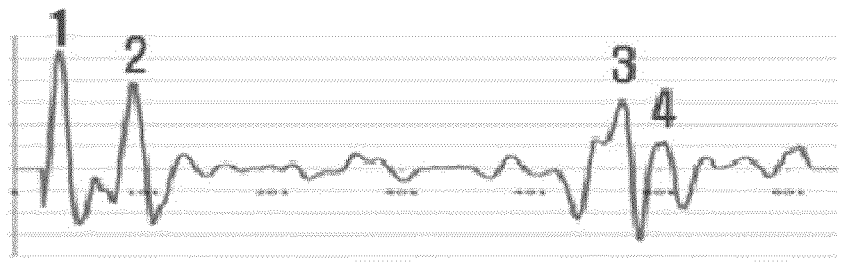
Figure 2:
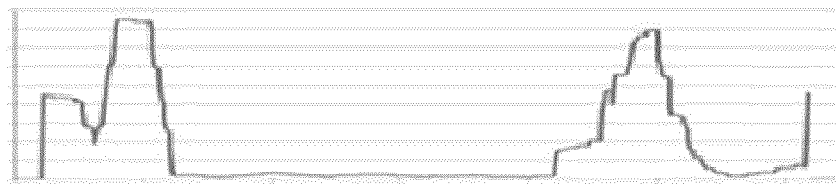
Figure 2:
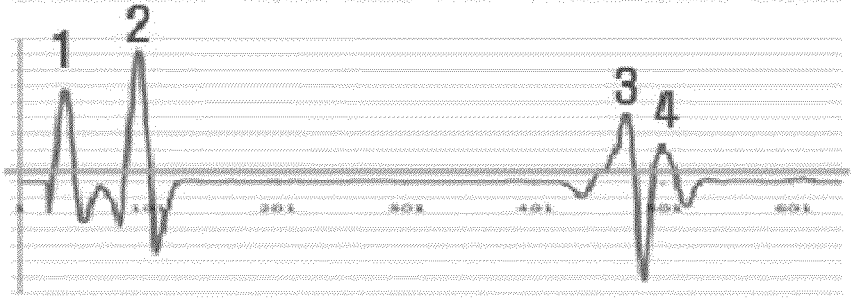
Figure 3:
FIG. 3 illustrates images showing a difference between a binarization method of the present invention and a gray level binarization method.
Figure 3:
Figure 3:

As illustrated in FIG. 1, a method for detecting a pedestrian based on a far IR camera at night of the present invention may include: receiving a thermal image of a pedestrian (S110); obtaining a first response value at each pixel of the input image using a difference of Gaussian (DoG) filter (S120); measuring a variance value at each pixel of the input image (S130); creating a binary image by binarizing a second response value at a pixel calculated through a multiplication of the first response value of the DoG filter and the variance value (S140); creating a pedestrian candidate cluster from the binary image (S150); detecting the pedestrian by classifying the pedestrian candidate cluster using at least one classifier learned based on a behavioral characteristic of the pedestrian (S160); and calculating a position of the pedestrian (S170).

Initially, in operation S110 of receiving a thermal image of a pedestrian, it is possible to detect a pedestrian using a far IR camera configured to project IR light invisible to a human.

In general, a camera using a coupled charged device (CCD) or a complementary metal-oxide semiconductor (CMOS) device configured to receive light incident via a lens and to convert the received light to an electrical signal serves to detect light of a visible area and project the detected light and thus, it is possible to obtain an image similar to an image viewed with eyes of a human.

On the other hand, the far IR camera uses a far IR band that is 8 μm to 15 μm in the wavelength of light. The wavelength of the far IR band varies based on a temperature and thus, is advantageous in identifying the temperature. A body temperature of a human has the wavelength of 10 μm and thus, it is possible to further accurately detect the pedestrian using the far IR camera.

Next, in operation S120 of obtaining a first response value at each pixel of the input image using a DoG filter, the first response value at each pixel of the input image may be obtained using the DoG filter that is an image processing algorithm for removing noise of a gray image and detecting a feature.

As represented in the following Equation 1, the DoG filter creates blurred images by performing, using two Gaussian filters having different standard deviations, convolution (which is a value obtained by multiplying pixels disposed to be around a predetermined pixel and a weight of each of the pixels and then adding up the multiplication results) of the input image and then calculates a difference between two images.

[Equation 1]

$$f(x; \mu, \sigma_1, \sigma_2) = \frac{1}{\sigma_1 \sqrt{2\pi}} \exp\left(-\frac{(x-\mu)^2}{2\sigma_1^2}\right) - \frac{1}{\sigma_2 \sqrt{2\pi}} \exp\left(-\frac{(x-\mu)^2}{2\sigma_2^2}\right)$$

More specifically, the DoG filter is an algorithm aiming to detect an image feature and is efficiently used to improve the visibility of an edge and other details in a digital image.

Also, noise is reduced through Gaussian filtering and thus, it is possible to remove unnecessary information in an image. Further, it is possible to maintain important information unseen due to a light through an object feature extraction.

Next, in operation S130 of measuring a variance value at each pixel of the input image, the variance value of each pixel may be measured by calculating contrast between a predetermined pixel of the input image and a neighbor pixel thereof.

Next, in operation S140 of creating a binary image by binarizing a second response value at a pixel calculated through a multiplication of the first response value of the DoG filter and the variance value, when a response value of a pixel is relatively low, the pixel is binarized as "0" (black) and when the response value of the pixel is relatively high, the pixel is binarized as "1" (white).

Binarization refers to representing all of the pixels using only "0" (black) and "1" (white).

The pedestrian in the thermal image has a characteristic that the first response value of the DoG filter and the variance value are very high. Thus, when binarizing a second response value of a pixel, a second response value of the pedestrian is "1" and appears to be high compared to "0" that is a second response value of a background and thus, the pedestrian and the background may be certainly separated.

That is, the pedestrian is represented in white and the background is represented in black.

Next, in operation S150 of creating a pedestrian candidate cluster in the binary image, the pedestrian candidate cluster may be created by grouping portions having a similar second response value at a pixel of the input image using a component labeling method.

Component labeling refers to an image processing algorithm used when distinguishing object areas separated from each other within an image, and enables each object to be independent by assigning the same label to all of the continuous pixels and assigning different labels to discrete pixels.

That is, when various types of objects are present within an image, a unique pixel value is assigned to each object through a labeling process. When only a predetermined single object is to be output on a screen, only an object having a unique pixel value corresponding to the predetermined object may be output.

Next, in operation S160 of detecting the pedestrian by classifying the pedestrian candidate cluster using at least one classifier learned based on a behavioral characteristic of the pedestrian, whether the pedestrian candidate cluster is the pedestrian may be finally determined by measuring a reliability value of each classifier created after performing learning with respect to a pedestrian cluster in which the pedestrian moves to the left or right with respect to a vehicle, a pedestrian cluster in which the pedestrian moves forward or backward with respect to a vehicle, and the like, and by fusing the respective reliability values.

Learning may be performed by classifying the pedestrian candidate cluster into three clusters including a cluster in which the pedestrian walks or runs to the left, a cluster in which the pedestrian walks or runs forward or backward, and a cluster in which the pedestrian walks or runs to the right.

Here, learning is to secure data for each similar motion by performing a plurality of tests based on a direction in which and an angle at which the pedestrian moves. By inputting the learning performed a plurality of times and physical characteristic data of a human, a thing or an animal excluding the pedestrian may be identified and be excluded from a pedestrian cluster.

Figure 4:
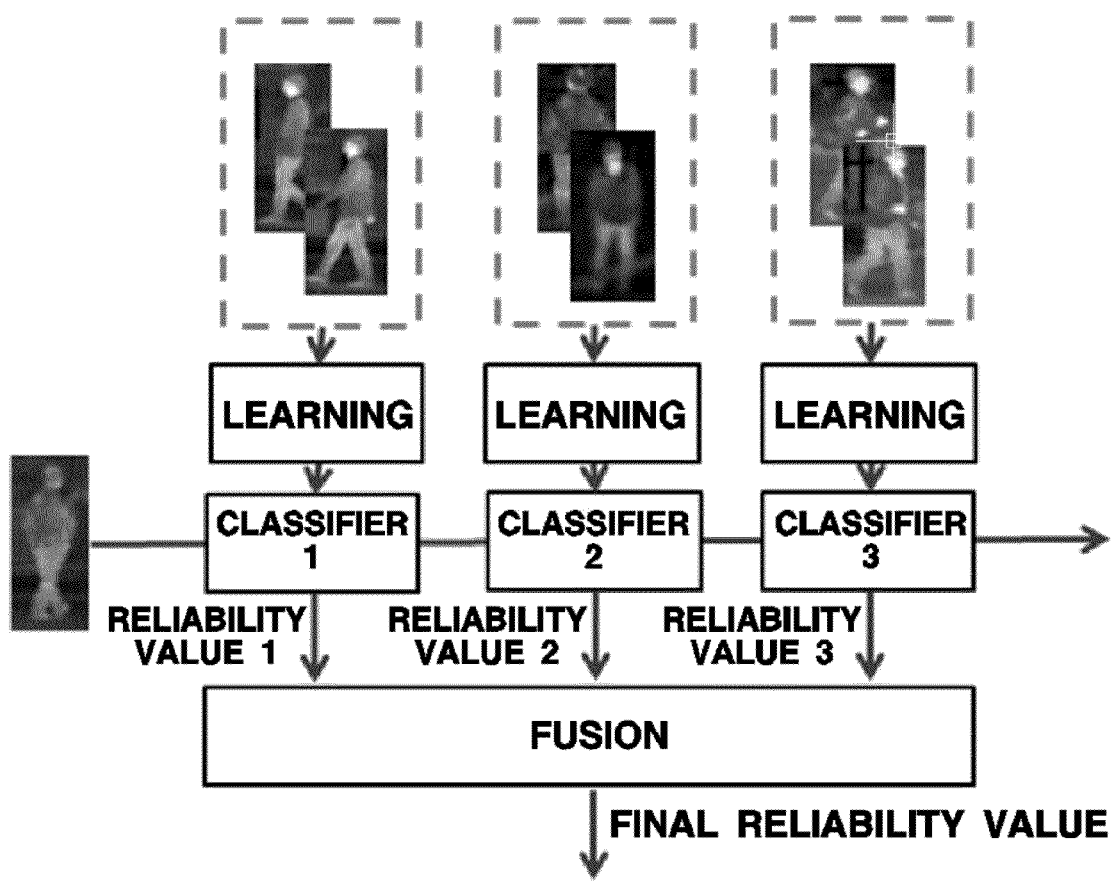
FIG. 4 is a diagram illustrating a pedestrian classifying method.

As illustrated in FIG. 4, after storing clusters classified through learning in classifiers 1, 2, and 3, respectively, and measuring a reliability value for each classifier, three reliability values are finally fused.

A reliability value is measured by comparing a similarity between learning data (behavioral pattern data) stored in a classifier and a behavioral pattern of a pedestrian cluster collected from an image. The reliability value may increase according to an increase in the similarity between the learning data and the behavioral pattern.

Also, when detecting a pedestrian, the classifier may also detect a motion direction of the pedestrian in which the pedestrian is moving.

Finally, in operation S170 of calculating a position of the pedestrian, the position of the pedestrian may be finally calculated based on position information of the classified pedestrian in the input image and camera calibration information.

When verifying position information of the pedestrian, a size of the pedestrian varies within a camera due to a distance separate from a vehicle. Thus, a parameter value ($\sigma$) of the DoG filter also needs to be changed based on the size of the pedestrian.

Figure 5:
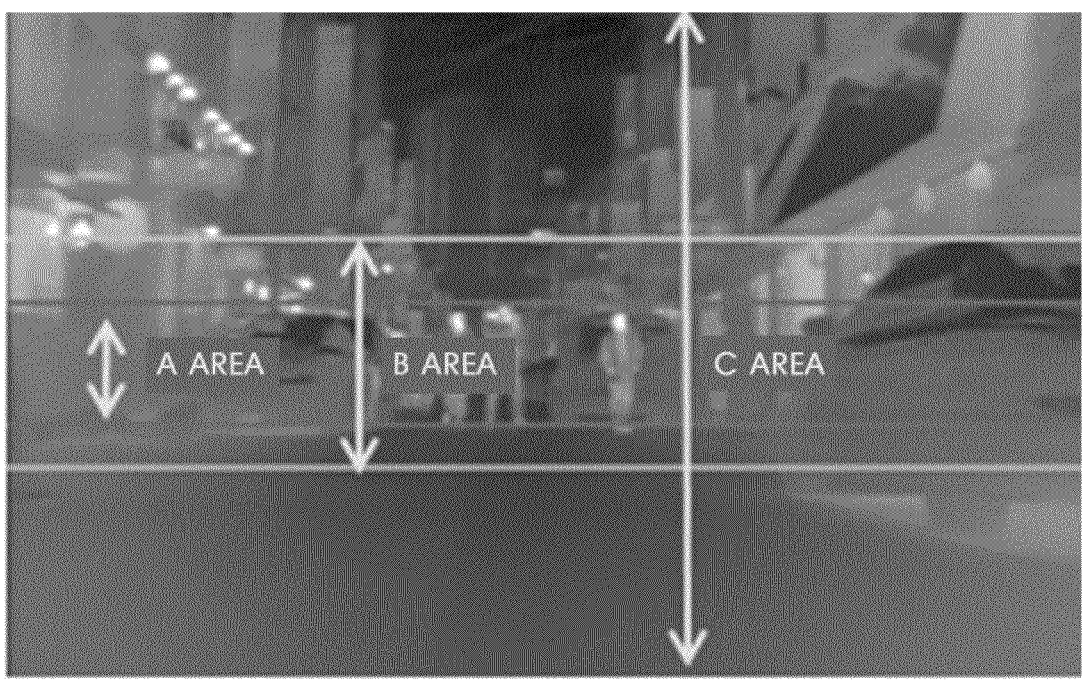
FIG. 5 is an image showing area segmentation for changing a parameter value of a difference of Gaussian (DoG) filter.

Accordingly, in operation S120 of obtaining a first response value of the input image using the DoG filter, the position of the pedestrian is verified after extracting the first response value by differently applying the parameter value of the DoG filter for each of areas A, B, and C of the image, as illustrated in FIG. 5.

Camera calibration information refers to measuring and indicating in advance a focal distance of a lens or a scale of an aperture estimated when photographing a scene having a sudden change in a distance between the camera and the object or light. When using calibration, there is an advantage in that it is possible to accurately indicate a focus or exposure of a target scene.

Accordingly, when using a change in the parameter value and camera calibration information, it is possible to more accurately verify the position of the pedestrian.

As described above, according to a method for detecting a pedestrian based on a far IR camera at night of the present invention, unlike the related art, a pedestrian is detected by setting a pedestrian cluster by filtering and binarizing a far IR image using a DoG filter, and by comparing a similarity between a behavioral pattern of the pedestrian cluster and behavioral pattern data learned and thereby stored. Accordingly, compared to the related art, a night pedestrian detection accuracy may be improved.

Although a method for detecting a pedestrian based on a far IR camera at night is described with reference to exemplary embodiments of the present invention, the scope of the present invention is not limited thereto and thus, it will be apparent to those skilled in the art that corrections, modifications, and various modified embodiments may be made without departing from the spirit of the present invention.

What is claimed is:

1. A method for detecting a pedestrian based on a far infrared ray (IR) camera at night, the method comprising:
   receiving a thermal image of a pedestrian;
   obtaining a first response value at each pixel of the thermal image using a difference of Gaussian (DoG) filter;
   measuring a variance value at each pixel of the thermal image;
   creating a binary image by binarizing a second response value at a pixel calculated through a multiplication of the first response value and the variance value;
   creating a pedestrian candidate cluster from the binary image using a component labeling method;
   detecting the pedestrian by classifying the pedestrian candidate cluster using at least one classifier learned based on a behavioral characteristic of the pedestrian; and
   calculating a position of the pedestrian.

2. The method of claim 1, wherein the thermal image is an image photographed through the far IR camera configured to project IR light.

3. The method of claim 1, wherein the first response value is a difference value at the same pixel of two images that are created by performing, by two Gaussian filters having different standard deviations, convolution of the thermal image, respectively.

4. The method of claim 1, wherein the variance value is a value obtained by calculating contrast between a single pixel of the thermal image and a neighbor pixel thereof.

5. The method of claim 1, wherein the binary image is an image in which a pixel having a relatively low second response value is binarized as "0" (black) and a pixel having a relatively high second response value is binarized as "1" (white).

6. The method of claim 1, wherein the creating of the pedestrian candidate cluster groups portions having a similar second response value and thereby clusters the portions into a single area using the component labeling method.

7. The method of claim 1, wherein the pedestrian candidate cluster is classified into three clusters including a cluster in which the pedestrian walks or runs to the left, a cluster in which the pedestrian walks or runs forward or backward, and a cluster in which the pedestrian walks or runs to the right.

8. The method of claim 1, wherein the detecting of the pedestrian finally determines whether the pedestrian candidate cluster is the pedestrian by measuring a reliability value of each classifier created after learning the pedestrian candidate cluster and by adding up the reliability values.

9. The method of claim 8, wherein the learning is to secure data for each similar motion by performing at least one test based on a direction in which and an angle at which the pedestrian moves.

10. The method of claim 8, wherein the reliability value is a numerical value of a similarity between learning data secured by each classifier and the pedestrian candidate cluster collected from the binary image.

11. The method of claim 10, wherein the reliability value increases according to an increase in the similarity.

12. The method of claim 1, wherein the position of the pedestrian is calculated based on position information of the classified pedestrian in the binary image and camera calibration information.

13. The method of claim 12, wherein the position information is obtained by changing a parameter value of the DoG filter based on a size of the pedestrian in the binary image.

* * * * *